Figure 1:
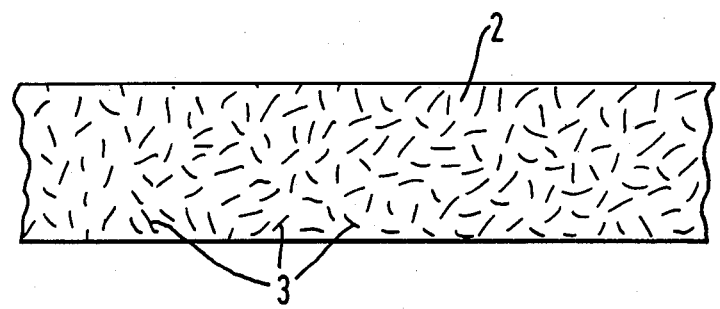

United States Patent [19]

Radvan et al.

[11] Patent Number: 4,543,288
[45] Date of Patent: Sep. 24, 1985

[54] FIBRE REINFORCED PLASTICS SHEETS

[75] Inventors: Bronislaw Radvan, Flackwell Heath; William T. H. Skelding, High Wycombe; Anthony J. Willis, Marlow, all of England

[73] Assignee: The Wiggins Teape Group Limited, United Kingdom

[21] Appl. No.: 688,723

[22] Filed: Jan. 4, 1985

[30] Foreign Application Priority Data

Jan. 6, 1984 [GB] United Kingdom ............... 8400291

[51] Int. Cl.$^4$ ............................................. B32B 5/06
[52] U.S. Cl. .................................. 428/297; 428/902; 428/903
[58] Field of Search ............... 428/268, 273, 290, 285, 428/297, 302, 902, 903

[56] References Cited

U.S. PATENT DOCUMENTS

| 3,837,986 | 9/1974 | Görter et al. | 428/302 |
| 4,234,652 | 11/1980 | Vanoni et al. | 428/903 |
| 4,242,404 | 12/1980 | Bondoc et al. | 428/302 |
| 4,495,238 | 1/1985 | Adiletta | 428/903 |

Primary Examiner—James J. Bell
Attorney, Agent, or Firm—Burns, Doane, Swecker & Mathis

[57] ABSTRACT

A solid fibre reinforced plastics material sheet comprising 20% to 60% by weight of reinforcing fibres having a high modulus of elasticity (as herein defined), a substantial proportion of the fibers being between 7 and 50 millimeters long and 13 microns or less in diameter, and 40% to 80% by weight of a thermoplastics material.

7 Claims, 2 Drawing Figures

FIBRE REINFORCED PLASTICS SHEETS

This invention relates to fibre reinforced plastics sheets.

Plastics sheet materials made of thermoplastic resins are widely used in the manufacture of moulded articles. Such materials are, however, not of great strength or rigidity, and where such properties are required, fibre reinforcement is introduced.

Thus, for example, in the manufacture of one such material, layers of glass fibre mat are interposed between layers of thermoplastics material, the composite structure being needled to produce a degree of integration of the layers and then heated under pressure to produce consolidated rigid sheets for use in moulding.

However, when used for deep draw moulding, it is found that such materials are not capable of being used to form mouldings of uniform structural strength. This is because the glass fibre mat is constituted of very long glass fibre strands (i.e. fibre bundles) of perhaps 200 centimeters or more which extend in a random serpentine manner throughout the whole sheet. This substantially restricts their movement during moulding in that they cannot flow with the molten thermoplastics material constituting the remainder of the structure. As a result, relatively thin parts of the moulding such as stiffening ribs are starved of fibre reinforcement. It is among the objects of the present invention to provide fibre reinforced plastics material for use in the moulding of fibre reinforced plastics articles which overcomes or alleviates the disadvantages of known materials as described above.

The invention therefore provides a solid fiber reinforced plastics sheet comprising from 20% to 60% by weight of reinforcing fibres having a high modulus of elasticity (as herein defined), a substantial proportion of the fibres being between 7 and 50 millimeters long and of 13 microns or less in diameter, and from 40% to 80% by weight of thermoplastics material.

Preferably, the fibres are in the form of single discrete glass fibres. Such fibres are usually provided bonded together into chopped strand bundles and these must be broken down into single fibres before the sheet is formed.

A high modulus of elasticity is to be taken as meaning a modulus of elasticity substantially higher than that of the sheet. Fibres falling into this category include glass, carbon and ceramic fibres and fibres such as the aramid fibres sold under the trade names Kevlar and Nomex and will generally include any fibre having a modulus higher than 10,000 Mega Pascals.

The discrete glass fibres should not be shorter than about 7 millimeters or of a diameter greater than 13 microns, since such fibres do not adequately reinforce the plastics matrix. Single fibres of other materials having a reinforcement efficiency at least as high as glass fibres may, alternatively, be used.

Figure 2:
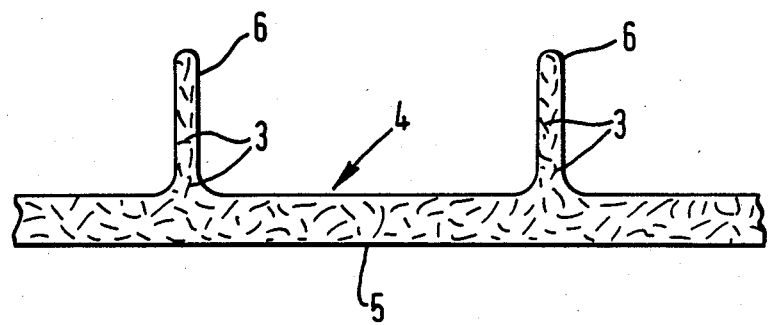

The invention will now be further described with reference to the accompanying drawings in which:

FIG. 1 is an enlarged section through a sheet of fibre reinforced plastics material according to the invention and, FIG. 2 is a sectional detail from a moulded article formed from a sheet of fibre reinforced plastics material according to the invention.

Referring to FIG. 1, this shows a sheet 1 constituted by a matrix 2 of thermoplastics material, consolidated by heat and pressure into a solid continuous form. Dispersed randomly throughout the matrix are fibres 3, a substantial proportion of which are between 7 and 50 millimeters long and less than 13 microns in diameter. Preferably, at least 95% of the fibres are within the dimensions specified.

Referring now to FIG. 2, this shows a section through a moulding produced by means of a hot moulding technique from the sheet shown in FIG. 1. The moulding 4 has a main web 5 from which reinforcing ribs 6 are outstanding. It will be seen that the fibres 3 have been extruded together with the plastics material, into the ribs 6 during moulding, thus substantially enhancing their strength.

COMPARATIVE EXAMPLE

In this example, comparative tests were made as between a sheet according to the invention made from 50% of single glass fibres 12 millimeters long and 11 microns in diameter and 50% polypropylene thermoplastic and a commercially available glass fibre/polypropylene sheet containing long bundles of continuous strands produced by lamination and consolidation as hereinbefore described. The commercially available sheet consisted of 30% glass fibre and 70% polypropylene and both sheets were of the same thickness. Both sheets were then subjected to a moulding process for producing a large tray like moulding with a depth of draw of about 12 centimeters and with thin internal stiffening ribs. Initially, the sheets were placed in a specially constructed infrared oven allowing controlled heating of the material until the polypropylene became fully molten at a temperature in excess of 200° C. throughout each sheet. When soft and pliable, each sheet was rapidly transferred by hand onto the lower half of an open moulding tool which was maintained at 90° C. The upper half of the tool was then applied by means of a hydraulic press and a full pressure of 25 bar reached 6 seconds after closure, the moulding then being removed and after cooling trimmed to remove flash.

The moulding produced from the sheet according to the invention conformed closely to the profile required, but that produced from the commercially available material did not, due mainly to the fact that the moulding pressure available was insufficient to achieve the full draw required.

Five one inch squares were then cut from corresponding positions at different parts of each moulding and these squares, together with the residue of each moulding placed in a muffle furnace. In the furnace, the volatile organic components were burnt off at 700° C. to leave a glass fibre residue.

The results are shown in the following table.

TABLE

| Square No. | Glass Fibre Content Invention | Glass Fibre Content Commercial Material |
| --- | --- | --- |
| 1 | 52 | 35 |
| 2 | 49 | 28 |
| 3 | 51 | 34 |
| 4 | 50 | 17 |
| 5 | 50 | 27 |
| sheet | 51 | 30 |

It will be apparent from the results set out in the Table that the glass fibre content remained much more consistent during moulding with the material of the invention than in the case of the commercially available material, even though the latter contained a higher proportion of thermoplastic material and was subjected to less distortion during moulding. This is believed to be due to the fact that the fibres in the sheet according to the invention were both more mobile and more flexible during the moulding process.

Suitable thermoplastics include polyethylene, polypropylene, polystyrene, acrilonitrylstyrenebutadiene, polyethyleneterephthalate and polyvinyl chloride, both plasticised and unplasticised. It is anticipated that any thermoplastics material may be used which is not chemically attacked by water and which can be sufficiently softened by heat without being chemically decomposed. Postformable thermosetting materials may also be included where the sheet is to be moulded within a sufficiently short time after formation that this is acceptable.

Numerous known techniques may be used for the production of the sheet according to the invention. Thus, a web of fibres and plastics powder may be produced by the process described in U.K. Pat. Nos. 1129757 and 1329409, after which it is immediately consolidated by means of a hot press. Alternatively, fibre containing resinous pellets may be produced which are then moulded into a sheet or the fibres may be dispersed in a liquid resin so as to produce a dough-like mass which is laid down on a hot calender bowl in laminations to produce the sheet.

The invention also extends to a composite in which several sheets according to the invention, but of different compositions, are laminated together.

Thus for example, four sheets, each of a weight of 500 grams per square metre, were prepared by the process of United Kingdom Pat. Nos. 1129757 and 1329409, two sheets having a glass fibre content of 40% by weight and two 60% by weight, the balance in each case being of polypropylene powder.

The four sheets were laminated together in a hot platen press with those having the higher gloss fibre contents forming the core of the laminate. The resulting laminate exhibited an increased flexural stiffness in comparison with a homogeneous sheet of the same thickness containing 50% of glass fibre.

We claim:

1. A solid fibre reinforced plastics material sheet comprising 20% to 60% by weight of reinforcing fibres having a high modulus of elasticity (as herein defined), a substantial proportion of the fibres being between 7 and 50 millimeters long and 13 microns or less in diameter, and 40% to 80% by weight of a thermoplastics material.

2. A solid fibre reinforced plastics material sheet as claimed in claim 1 in which the fibres are in the form of single discrete glass fibres.

3. A solid fibre reinforced plastics material sheet as claimed in claim 1 in which the plastics material is thermoplastic.

4. A solid fibre reinforced plastics material sheet as claimed in claim 3 in which the thermoplastics material is selected from the group consisting of polyethylene, polypropylene, polystyrene, acrilonitrylstyrenebutadiene, polyethyleneterephthalate and polyvinylchloride, both plasticised and unplasticised.

5. A solid fibre reinforced plastics material sheet as claimed in claim 1 in which the plastics material is a postformable thermosetting material.

6. A solid fibre reinforced plastics material sheet as claimed in claim 3 in which the plastics material is thermoplastic.

7. A solid fibre reinforced plastics material sheet as claimed in claim 2 in which the plastics material is a post-formable thermosetting material.

* * * * *

REEXAMINATION CERTIFICATE (813th)

United States Patent [19]

Radvan et al.

[11] B1 4,543,288

[45] Certificate Issued  Jan. 26, 1988

[54] FIBRE REINFORCED PLASTICS SHEETS

[75] Inventors: Bronislaw Radvan, Flackwell Heath; William T. H. Skelding, High Wycombe; Anthony J. Willis, Marlow, all of England

[73] Assignee: The Wiggins Teape Group Limited, United Kingdom

Reexamination Request:
No. 90/001,132, Nov. 24, 1986

Reexamination Certificate for:
Patent No.: 4,543,288
Issued: Sep. 24, 1985
Appl. No.: 688,723
Filed: Jan. 4, 1985

[30] Foreign Application Priority Data

Jan. 6, 1984 [GB] United Kingdom ............... 8400291

[51] Int. Cl.⁴ .................................................. B32B 5/06
[52] U.S. Cl. ................................... 428/297; 428/902; 428/903

[58] Field of Search .............. 428/288, 290, 291, 902, 428/903

[56] References Cited

U.S. PATENT DOCUMENTS

| | | | |
|---|---|---|---|
| 3,975,483 | 8/1976 | Rudloff | 264/137 |
| 4,426,470 | 1/1984 | Wessling et al. | 524/35 |
| 4,498,957 | 2/1985 | Sasaki et al. | 528/118 |
| 4,508,777 | 4/1985 | Yamamoto et al. | 428/280 |

FOREIGN PATENT DOCUMENTS

| | | |
|---|---|---|
| 703023 | 1/1954 | United Kingdom . |
| 1129757 | 10/1968 | United Kingdom . |
| 1263812 | 2/1972 | United Kingdom . |
| 1329409 | 9/1973 | United Kingdom . |
| 1348896 | 3/1974 | United Kingdom . |

*Primary Examiner*—James J. Bell

[57] ABSTRACT

A solid fibre reinforced plastics material sheet comprising 20% to 60% by weight of reinforcing fibres having a high modulus of elasticity (as herein defined), a substantial proportion of the fibres being between 7 and 50 millimeters long and 13 microns or less in diameter, and 40% to 80% by weight of a thermoplastics material.

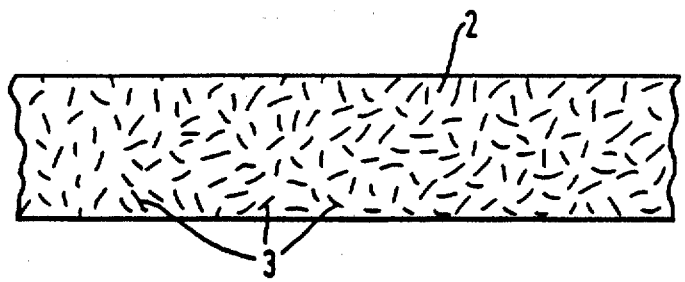

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 2 and 6 are cancelled.

Claims 1, 3, 5 and 7 are determined to be patentable as amended.

Claim 4, dependent on an amended claim, is determined to be patentable.

1. A solid fibre reinforced plastics material sheet [comprising] *consisting essentially of* 20% to 60% by weight of *glass* reinforcing fibres having a high modulus of elasticity [(as herein defined)], a substantial proportion of the fibres being *single discrete fibers* between 7 and 50 millimeters long and 13 microns or less in diameter, and 40% to 80% by weight of a thermoplastics material.

3. A solid fibre reinforced plastics material sheet as claimed in claim 1 in which the plastics material [is] *consists of a* thermoplastic.

5. A solid fibre reinforced plastics material sheet [as claimed in claim 1 in which the plastics material is] *consisting essentially of 20% to 60% by weight of glass reinforcing fibres having a high modulus of elasticity, a substantial proportion of the fibres being single discrete fibers between 7 and 50 millimeters long and 13 microns or less in diameter, and 40% to 80% by weight of a* post-formable thermosetting material.

7. A solid fibre reinforced plastics material sheet as claimed in claim [2] *5* in which the plastics material [is] *consists of* a post-formable thermosetting material.

* * * * *